United States Patent
Katz et al.

(10) Patent No.: US 9,514,609 B2
(45) Date of Patent: Dec. 6, 2016

(54) TEAM GAMING SYSTEM AND METHOD THEREFOR

(71) Applicant: LOOLI, CORP., Boca Raton, FL (US)

(72) Inventors: Howard B. Katz, Boca Raton, FL (US); Denise E. Katz, Boca Raton, FL (US)

(73) Assignee: LOOLI, CORP., Boca Raton, FL (US)

( * ) Notice: Subject to any disclaimer, the term of this patent is extended or adjusted under 35 U.S.C. 154(b) by 0 days.

(21) Appl. No.: 14/695,295

(22) Filed: Apr. 24, 2015

(65) Prior Publication Data

US 2015/0310703 A1  Oct. 29, 2015

Related U.S. Application Data

(60) Provisional application No. 61/985,263, filed on Apr. 28, 2014.

(51) Int. Cl.
*G07F 17/32* (2006.01)
*A63F 13/323* (2014.01)

(52) U.S. Cl.
CPC ....... *G07F 17/3244* (2013.01); *G07F 17/3272* (2013.01); *A63F 13/323* (2014.09); *G07F 17/3225* (2013.01)

(58) Field of Classification Search
CPC .......... G07F 17/3225; G07F 17/3237; G07F 17/3272; G07F 17/3288; A63F 2300/537; A63F 2300/572; A63F 2300/556; A63F 2300/5566; A63F 13/87; A63F 13/795; A63F 13/847; A63F 13/323; A63F 2300/403; A63F 2300/408
See application file for complete search history.

(56) References Cited

U.S. PATENT DOCUMENTS

| 8,403,758 | B2 | 3/2013 | Hornik et al. | |
|---|---|---|---|---|
| 2002/0094869 | A1 | 7/2002 | Harkham | |
| 2004/0162144 | A1 | 8/2004 | Loose et al. | |
| 2008/0261682 | A1* | 10/2008 | Phillips ................ | G07F 17/322 463/25 |
| 2010/0279764 | A1 | 11/2010 | Allen et al. | |
| 2011/0300926 | A1 | 12/2011 | Englman et al. | |
| 2012/0004037 | A1* | 1/2012 | Hill ............................... | 463/42 |
| 2013/0040730 | A1 | 2/2013 | Barclay et al. | |
| 2014/0106869 | A1 | 4/2014 | Dewaal | |
| 2014/0370971 | A1* | 12/2014 | Kelly et al. .................... | 463/25 |

OTHER PUBLICATIONS

Mohegan Sun launches online casino in New Jersey All Gaming All the World Casino Journal, Jul. 23, 2015 http://www.casinojournal.com/articles/89941-mohegan-sun-launches-online-casino-in-new-jersey.

* cited by examiner

*Primary Examiner* — Damon Pierce
(74) *Attorney, Agent, or Firm* — Weiss & Moy, P.C.; Veronica-Adele R. Cao (57) ABSTRACT

A system and method for allowing multiple players to place independent wagers on a single game is disclosed. The game may be played on either a gaming machine or at a gaming event. A main player is physically located at a system operator, such as a casino. Additional players may join the main player and place wagers on the games that the main player is playing. The wagers that the additional players place are treated and paid out independently from the wagers placed by the main player. Furthermore, the players and the main player may communicate with each other throughout the betting process.

12 Claims, 5 Drawing Sheets

Reconciliation File Header Format

| FieldName | Value |
|---|---|
| Casino Id | Unique System Casino Identifier |
| Casino Name | Name of Casino |
| System Feed Name | Name of Feed |
| File Create Date | Date/Time of Creation in MMDDYYYYMMSS Format |
| File Identifier | Unique System Identifier for File |

Figure 3

Reconciliation Record Format

| FieldName | Value |
|---|---|
| TeamPlayer Unique Id | Unique System Id for TeamPlayer |
| TeamPlayer Name | Name of TeamPlayer |
| Transaction Date | Date/Time of Transaction in MMDDYYYYMMSS Format |
| Debit/Credit Indicator | 1 for Credit, 2 for Debit |
| Currency Code | ISO 4217 Currency Codes i.e. USD |
| Transaction Amount | xxx,xxx,xxx,xxx.xx |
| Casino Game Id | Unique System identifier for Gaming Machine or Event |

Figure 4

System Demographic File Header Format

| FieldName | Value |
|---|---|
| Casino Id | Unique System Casino Identifier |
| Casino Name | Name of Casino |
| System Feed Name | Name of Feed |
| File Create Date | Date/Time of Creation in MMDDYYYYMMSS Format |
| File Identifier | Unique System Identifier for File |

Figure 5

System Demographic Record Format

| FieldName | Value |
|---|---|
| TeamPlayer Unique Id | Unique System Id for TeamPlayer |
| TeamPlayer Name | Name of TeamPlayer |
| TeamPlayer Address1-4 | Address Line 1 through 4 |
| TeamPlayer Country Code | Country Code |
| Team Player State | State Code |
| TeamPlayer City | City Code |
| TeamPlayer Zip | Postal Code |
| TeamPlayer Phone No. | Phone number |
| TeamPlayer Email | Email Address |
| Casino Player Id | Identifier issued to player by this Casino |
| Transaction Date | Date/Time of Transaction in MMDDYYYYMMSS Format |

| FieldName | Value |
| --- | --- |
| Transaction Type Code | Code to identify transaction type |
| Casino Id | Unique System Casino Identifier |
| System Game Id | Unique System Game Identifier |
| System Transaction Id | Unique System Transaction Id |
| Main Player Id | Unique Identifier for TeamPlayer acting as Main Player |
| TeamPlayer Unique Id | Unique System Id for TeamPlayer |
| TeamPlayer Bet Amount | Amount of Bet xxx,xxx,xxx,xxx.xx |
| Bet Currency Code | ISO 4217 Currency Codes i.e. USD |
| Specific Game Related | This data type is specific to each game |
| *Repeat fields 1-4 as required for each TeamPlayer playing* | |
| Transaction Date | Date/Time of Transaction in MMDDYYYYMMSS Format |

Figure 8

| FieldName | Value |
| --- | --- |
| Transaction Type Code | Code to identify transaction type |
| Casino Id | Unique System Casino Identifier |
| System Game Id | Unique System Game Identifier |
| System Transaction Id | Unique System Transaction Id |
| Status Code | Status of game Transaction; success or failure codes |
| Main Player Id | Unique Identifier for TeamPlayer acting as Main Player |
| TeamPlayer Unique Id | Unique System Id for TeamPlayer |
| Result Code | Code for bet status: win, lose, blocked |
| TeamPlayer Amount | Amount of win/loss Bet xxx,xxx,xxx,xxx.xx |
| Bet Currency Code | ISO 4217 Currency Codes i.e. USD |
| Specific Game Related | This data type is specific to each game |
| *Repeat fields 1-5 as required for each TeamPlayer playing* | |
| Transaction Date | Date/Time of Transaction in MMDDYYYYMMSS Format |

TEAM GAMING SYSTEM AND METHOD THEREFOR

CROSS-REFERENCE TO RELATED APPLICATION

This non-provisional application claims priority to U.S. Provisional Application No. 61/985,263 filed on Apr. 28, 2014 in the name of the Applicants herein, which is incorporated herein by reference.

FIELD OF THE INVENTION

The present invention relates generally to the field of casino games. More specifically, the present invention is a gaining system and related method that allows other people to play along with a player who is physically present at a gaining machine or other activity where bets are being placed on the outcome of a game.

BACKGROUND OF THE INVENTION

The present invention proposes a unique and new gaining system and method to include other players when a person is playing at a gaming machine or other gaming event. This new gaming system and method does not require each additional player to be physically present with the person playing the gaming machine or at the gaining event.

The gaming system provides a method that allows other people to play along with a player who is physically present at a gaming machine or other activity where bets are being placed on the outcome of a game (e.g. a slot machine) or gaming event (e.g. a horse race). When a person walks up to the gaming machine to play a game or is present at a betting venue/event he may connect to the gaming system via a smart-device such as, but not limited to, a Smartphone to notify and allow other people who are also enrolled with the gaming system to play along with him.

Each person playing along with the player at the machine or venue/event may place bets independently of the player. These independent bets do not depend on the outcome of the bet made by the person playing at the gaming machine or gaming venue/event.

The purpose of the gaming system is to increase participation in the gaming process and thereby increase the amount of bets that are placed. In addition it is envisioned that the gaming system will create a social event allowing many people to participate in the betting process at the same gaming machine or venue/event.

With pre-existing gaming systems, the betting process may have only involved a single individual. The gaming system herein allows each gaming machine (e.g. slot machine) to be used by many people at the same time in a highly interactive and social environment.

SUMMARY

In accordance with one embodiment of the present invention, a method for allowing multiple players to place independent wagers on a single game. The method comprises the steps of: identifying a main player that is playing a game at one of a gaming machine and a gaining event located within a system operator; joining at least a second player with the main player, wherein the second player is remotely located from the system operator; creating a dynamic transaction summary for the game wherein the dynamic transaction summary for the game is comprised of identification information of the main player, identification information of the second player, identification information of the system operator; identification information for one of the gaming machine and the gaming event; an amount of at least one wager placed by the main player; an amount of at least one additional wager placed by the second player; date; and time; determining whether the main player is eligible to place the wager on the game, wherein one of a payment made directly through the gaining machine and a system bank account balance of the main player determines the eligibility of the main player; determining whether the second player is eligible to place the additional wager on the game, wherein only a system bank account balance of the second player determines the eligibility of the second player; updating the dynamic transaction summary based on the individual eligibility of each of the main player and the second player to place the wager and the additional wager respectively; transmitting the updated dynamic transaction summary to the system operator; receiving data from the system operator regarding an outcome of the game; and updating the system bank account balance of the main player by one of crediting and debiting the amount of the wager placed by the main player and updating the system bank account balance of the second player by one of crediting and debiting the amount of the additional wager placed by the second player depending upon the outcome of the game.

In accordance with another embodiment of the present invention, a team gaming system that allows multiple players to place independent wagers on a sign game is disclosed. The team gaming system comprises: a network configured for communication between a system organization, one or more system operators, and a plurality of players registered with the system organization; at least one system organization server with a database containing information for the plurality of players, wherein the at least one system organization server has a processor configured to access the database and to execute a set of program instructions causing the processor to: identify a main player that is playing a game at one of a gaming machine and a gaming event located within a system operator; join at least a second player with the main player, wherein the second player is remotely located from the system operator; create a dynamic transaction summary for the game wherein the dynamic transaction summary for the game is comprised of; identification information of the main player, identification information of the second player, identification information of the system operator; identification information for one of the gaming machine and the gaming event; an amount of at least one wager placed by the main player; an amount of at least one additional wager placed by the second player; date; and time; determine whether the main player is eligible to place the wager on the game, wherein one of a payment made directly through the gaming machine and a system bank account balance of the main player determines the eligibility of the main player; determine whether the second player is eligible to place the additional wager on the game, wherein only a system bank account balance of the second player determines the eligibility of the second player; update the dynamic transaction summary based on the individual eligibility of each of the main player and the second player to place the wager and the additional wager respectively; transmit the updated dynamic transaction summary to the system operator; receive data from the system operator regarding an outcome of the game; and update the system bank account balance of the main player by one of crediting and debiting the amount of the wager placed by the main player and update the system bank account balance of the second player by one of crediting and debiting the amount of the additional wager placed by the second player depending upon the outcome of the game.

In accordance with another embodiment of the present invention, A method for allowing multiple players to place independent wagers on a single game comprising the steps of: identifying a main player that is playing a game at one of a gaming machine and a gaining event located within a system operator; transmitting data to at least a second player regarding the identification of the main player at the system operator, wherein the at least second player is remotely located from the system operator; receiving data from the main player regarding at least one wager that the main player is placing on a game; receiving data from the at least second player regarding at least one additional wager that the at least second player is placing on the same game; creating a dynamic transaction summary for the game wherein the dynamic transaction summary for the game is comprised of: identification information of the main player, identification information of the at least second player, identification information of the system operator; identification information for one of the gaming machine and the gaming event; an amount of the at least one wager placed by the main player; an amount of the at least one additional wager placed by the at least second player; date; and time; determining whether the main player is eligible to place the wager on the game, wherein one of a payment made directly through the gaining machine and a system bank account balance of the main player determines the eligibility of the main player; determining whether the second player is eligible to place the additional wager on the game, wherein only a system bank account balance of the second player determines the eligibility of the second player; updating the dynamic transaction summary based on the individual eligibility of each of the main player and the at least second player to place the at least one wager and the at least one additional wager respectively; transmitting the updated dynamic transaction summary to the system operator; receiving data from the system operator regarding an outcome of the game; transmitting the data received from the system operator regarding the outcome of the game to the at least second player; updating the system bank account balance of the main player by one of crediting and debiting the amount of the at least one wager placed by the main player and updating the system bank account balance of the at least second player by one of crediting and debiting the amount of the at least one additional wager placed by the at least second player depending upon the outcome of the game; and settling the at least one wager made by the main player and settling the at least one additional wager made by the at least second player with the system operator.

BRIEF DESCRIPTION OF THE DRAWINGS

The present application is further detailed with respect to the following drawings. These figures are not intended to limit the scope of the present application, but rather, illustrate certain attributes thereof.

DETAILED DESCRIPTION OF THE INVENTION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Figure 1:
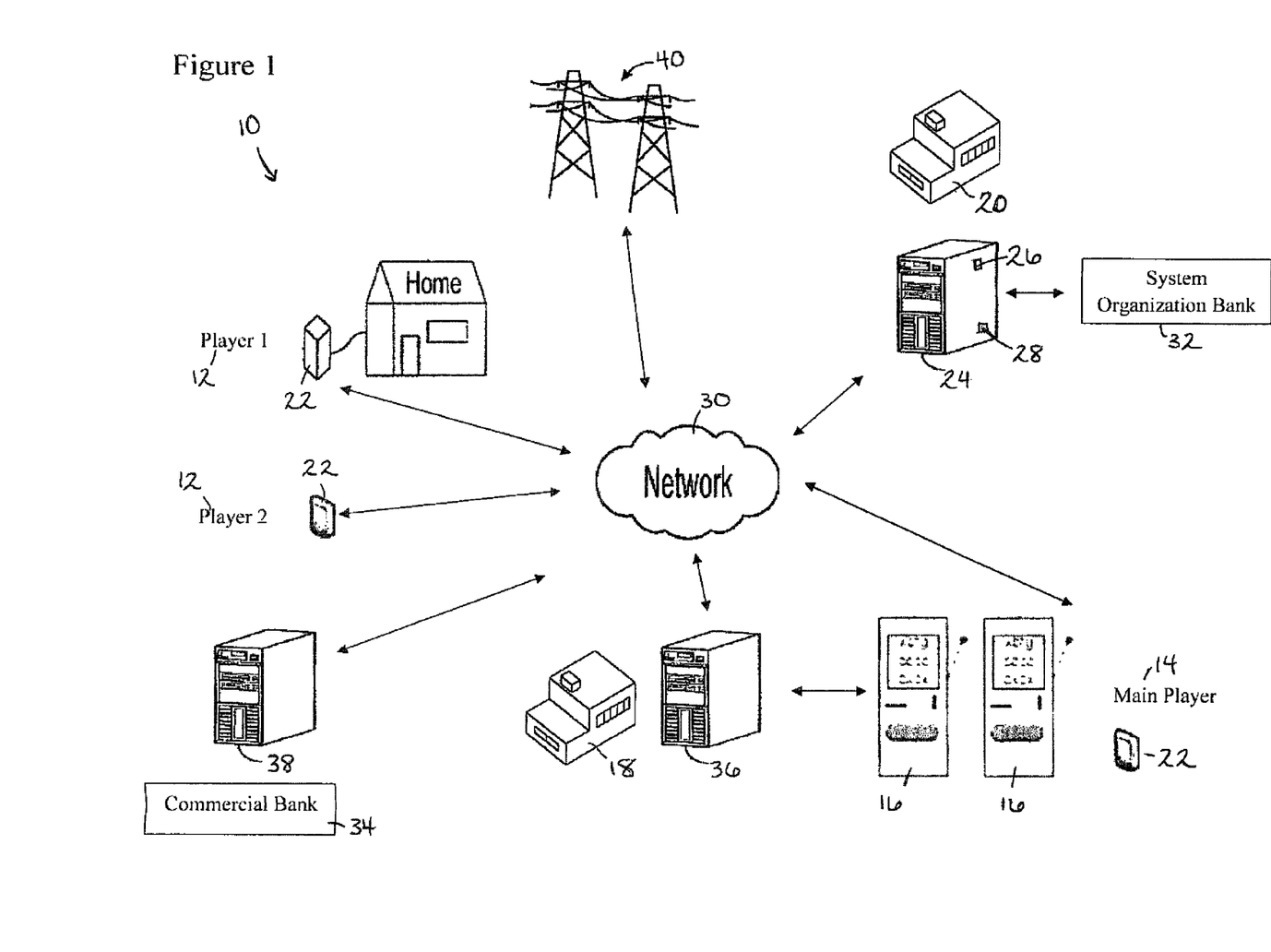
FIG. 1 is an exemplary gaming system according to one or more aspects of the present invention.

FIGS. 1-8 together disclose the gaming system and method of the present invention. Referring to FIG. 1, an exemplary team gaming system 10 is shown. The system 10 provides a method for people (players 12) who are remotely located to play along with a main player 14; the remotely located players 12 may be located in areas outside of the system operator 18 (e.g. casino) where the gaming machine 16 that the main player 14 is playing on is located or the remotely located players 12 may be located within the system operator 18 but away from the gaming machine 16 (e.g. in the hotel room of the casino where the gaming machine 16 that the main player 14 is playing on is located). A main player 14 is a player 12 that is physically present at a gaming machine 16 (e.g. a slot machine) or physically present at another activity where bets are being placed on the outcome of a game (e.g. a gaining event or venue such as a horse race). Each player 12 that is remotely located and playing along with the main player 14 at the gaming machine 16 or gaming event may place bets independently of the main player 14. These independent bets do not need to depend on the outcome of the bet made by the main player 14 playing at the gaming machine 16 or gaming event. In the system 10, it is as if the remotely located players 12 were also physically located at the same gaming machine 16 playing on their own individual machines or also physically located at the same gaming event and placing their own bets.

The system 10 may comprise a system administrator or organization 20, a system organization bank 32, one or more system operators 18 (e.g. casino, race track), one or more commercial banks 34, one or more smartdevices 22 operated by one or more players 12, cellular phone carriers 40, and gaming machines 16 all connected via a network 30. The network 30 may be connected by wired or wireless means which may include, but are not limited to, cellular, satellite, local area network (LAN), wide area network (WAN), Virtual Private Networks (VPN), or global network (e.g. Internet). The network 30 may also include Bluetooth wireless technology when using a smartdevice 22 to communicate locally with a gaining machine 16 or other device/entity in the system 10.

In the system 10, the system organization 20, the system operators 18, and the commercial banks 34 may communicate with each other over the network 30 via their respective server(s) 24, 36, 38. The system organization 20 may have one or multiple servers 24; e.g. the system 10 may have one or more servers 24 dedicated to the gaming aspects of the system 10, one or more servers 24 dedicated to the communications aspects of the system 10, and one or more servers 24 dedicated to the accounting aspects of the system 10. Alternatively, the system 10 may have one or more servers 24, wherein each server 24 may be capable of handling all of the gaming aspects, communications aspects, and the accounting aspects of the system 10.

The system organization's 20 server 24, the system operator's 18 server 36, and the commercial bank's server 38 may each have its own processor and memory or database. The system organization's 20 server 24 may have a processor 28 as well as a database 26 for storing information relating to the players 12, the gaming machines 16, the system operators 18, financial institutions, and any other entity of the system 10. For example, regarding information about the players 12, the database 26 may store information such as the player's name, authentication credentials (e.g. ID and password), contact information (e.g. phone number, address, e-mail, etc.), Player Identification Number (PIN), credit card/debit card/bank account information, system account information, enrollment date, photo identification (e.g. driver's license), tax forms, and loyalty points earned through the system. Loyalty points may be accumulated by the player 12 using the system 10 over a certain period of time or by spending certain amounts of money over periods of time on a gaming machine 16 or at a gaming event run by a specific system operator 18 (e.g. casino or race track). These points may be redeemed by the player 12 for benefits such as free rooms or meals if the system operator 18 is a casino or hotel. Regarding the gaming machines 16, the database 26 may store identification names and or codes for each gaming machine 16.

The database 26 may also contain information regarding the amount of money that a player 12 has in his account. The database 26 may store information regarding the balance in the player's 12 account, as well as the bets that the player 12 has made and the amounts and outcomes of those bets. The data may then be transmitted to and analyzed by the system organization 20. The processor 28 may be used to control the various functions of the team gaming system 10. The processor 28 may be implemented in hardware, software, or a combination thereof. The processor 28 may store a computer program or other programming instructions associated with the database 26 to control the operation of the system 10. The data and structures and code within the software in which the present invention may be implemented, may typically be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor 28 may comprise various computing elements, such as integrated circuits, microcontrollers, microprocessors, programmable logic devices, etc. alone or in combination to perform the operations described herein.

According to one embodiment, the system 10 may comprise a gaming machine 16 that is present within a system operator 18 (e.g. casino), or other suitable location, that provides a game of chance that the main player 14 physically operates. For example, the gaming machine 16 may be a slot machine. The system 10 may use any suitable game of chance wherein the game may be displayed, wherein its players 12 may be identified, wherein its players 12 can place bets, and wherein the outcome of the games may be displayed electronically. The system may also comprise a plurality of gaming machines 16. Each gaming machine 16 may therefore have a unique identifier, such as a name or identification code, so that they may be easily identified within the system 10. According to another embodiment, a gaming event may be used instead of a gaming machine 16. Examples of a gaming event may include, but is not limited to, dog races, horse races, jai alai, or any other live event where the betting odds are displayed and players 12 are allowed to place bets. The gaming event may also have a unique identifier, such as a name or identification code, so that they may be easily identified within the system 10. The main player 14 may use cash, a system account, tokens, or any other acceptable payment method to place a bet at the gaming machine 16 or gaming event, but the other players 12 may use only their system account to place their bets.

In one example where the gaming machine 16 is a slot machine, the gaming machine 16 may have a screen to display to the main player 14 what he is betting on (e.g. a row of characters); a screen to display messages or videos to the main player 14; speakers or headphone jacks to play messages or allow other players 12 to speak to the main player 14; a microphone to allow the main player 14 to speak with other players 12 playing with him; a keyboard, touch screen, handle or other input mechanism to allow the main player 14 to enter commands into the gaining machine 16; and a player card reader to allow the gaming machine 16 to read an identification card of the main player 14. The identification card may be made of plastic, metal, or some other suitable material and have a magnetic strip or electronic chip therein for storing information about players 12 who are enrolled to use the system 10 (e.g. name, contact information, Personal Identification Numbers, etc.). The gaming machines 16 may also include capability for Bluetooth wireless communication or Near Field Communication (NFC) in order to interact with a smartdevice 22 for authentication or other purposes. Each gaming machine 16 may also transmit and receive data through the network 30 via the system operator's 18 server(s) 36.

In another embodiment, the gaming machine 16 may also have a display that allows the main player 14 to interact with other players 12. The main player 14 may have the ability to control how the players 12 are shown on the display; e.g. the main player 14 may use a touch screen interface, keypad, arrow keys or other input device to control how many other players 12 are shown on the display and what the layout of the display will look like. The main player 14 may also use the keyboard or other input device to interact with the system 10, other main players 14, and other players 12. The gaming machine 16 may also have a CPU, memory, and/or disk storage that incorporates the display, touch screen, keyboard, and other devices such as a video camera, speaker, mouse and operating system control software to allow it to run application software.

In still another embodiment, the gaming machine 16 may be a virtual slot machine where the slot machine has all the hardware of a basic slot machine but also includes the ability to interact with the system 10. The virtual representation of the slot machine will allow the player 12 to act as a main player 14. Using the virtual slot machine, a player 12 will be able to connect/log in to the system 10, place bets, and interact with other players 12 in the system allowing the other players 12 to be alongside with the user of the virtual slot machine.

The system 10 may comprise a plurality of smartdevices 22. A smartdevice 22 may be a smartphone, a computing tablet, a personal computer, or any other electronic computing device capable of transmitting and receiving data via service provided by a cellular phone carrier 40 or internet service provider. The system organization 20 via its server 24 may transmit data to a smartdevice 22 such as the identification and/or location of main players 14 that are currently playing. A player 12 may be able to search and view a list of main players 14 that are playing at the gaming machines 16 or at a gaming event and select which main player 14 he wishes to play with, and place bets through his smartdevice 22. The list of main players 14 is dynamic as it is constantly updated as the main players 14 check in at and leave a gaming machine 16 or gaming event. A smartdevice 22 may transmit data to the system organization 20 relating to the identification and/or location of a player 12 who is not present at the gaming machine 16 or gaming event as well as transmit data (a request) to the system organization 20 regarding the identity of a main player 14 that the player 12 has chosen to play with on a gaming machine 16 or at a gaming event. The smartdevice 22 may also transmit data to the system organization 20 regarding the amount that the player 12 wishes to bet. The data relating to the identification and/or location of the player 12 and betting selections may be transmitted to the system organization 20 which may then be relayed to another smartdevice 22 or system operator 18. It should be understood that substantial benefit may also be derived from the smartdevices 22 being able to communicated directly with other smartdevices 22 or directly with the system operators 18.

The system organization 20 may transmit data via its server 24 to the gaming machine 16 and/or smartdevice 22 of a main player 14 at a gaming event such as the identity of each player 12 that wishes to play with that main player 14 at that gaming machine 16 or gaming event. Each gaming machine 16 may transmit data via the system operator's 18 server 36 to the system organization 20 such as the identification name and/or codes for the gaining machine 16, the gaming machine's 16 location (e.g. which casino the gaming machine 16 is in), the identity of the main player 14 that is playing that gaming machine 16, and identity of each player 12 that the main player 14 wishes to notify that he is playing at that gaming machine 16. At a gaming event, the main player 14 may use his smartdevice 22 to transmit data via his cellular phone carrier 40 and/or internet services provider to the system organization 20 such as the main player's 14 identity, location, and the identity of each player 12 that the main player 14 wishes to notify that he is playing at the gaming event.

Figure 2:
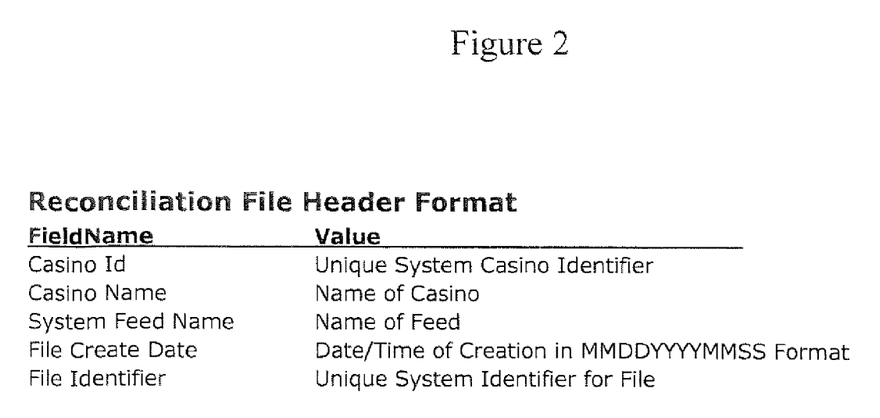
FIG. 2 is an exemplary reconciliation file header generated by the system organization server depicted in FIG. 1 showing transaction data according to one or more aspects of the present invention.
Figure 3:
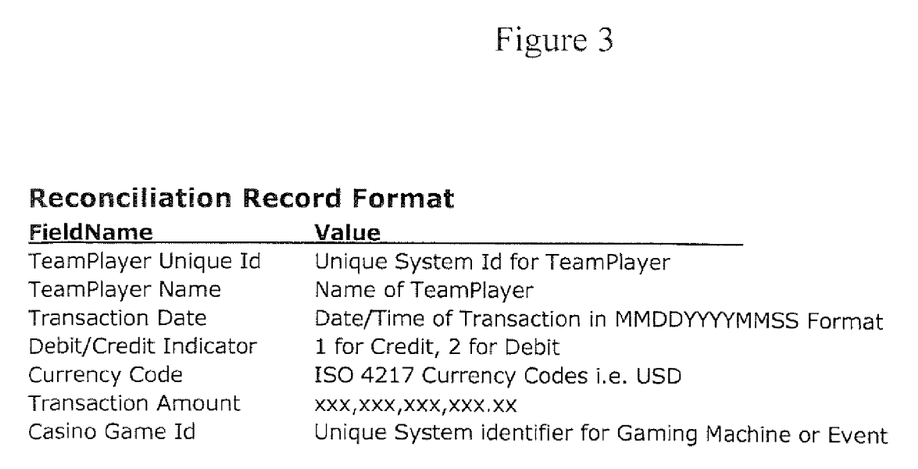
FIG. 3 is an exemplary reconciliation record generated by the system organization server depicted in FIG. 1 showing transaction data according to one or more aspects of the present invention.

Referring to FIGS. 2-3, the system organization 20 via its server 24 may communicate with the server 36 of the system operators 18 in real time and transmit data to the system operator 18 (e.g. casino) such as a data feed containing information regarding every transaction (e.g. debit or credit) that occurs through the system 10. For example the data feed may contain information such as identification number and/or name of the player 12, date of the transaction, type of transaction, type of currency used for the transaction, transaction amount, the location of the gaming machine 16 or gaming event, and identification name/number for the gaming machine 16 on which the transaction occurred. The system organization 20 may transmit this information to the system operator 18 so that the system operator 18 may reconcile the gaming transactions for each player 12. The system operator 18 may transmit data via its server 36 to the system organization 20 such as the outcome of the game and the results of the transactions (wins/losses). The data feed allows the system operator 18 to reconcile the wins and losses of the players 12 with money transfers that occur between the system organization 20 and the system operator 18.

Figure 4:
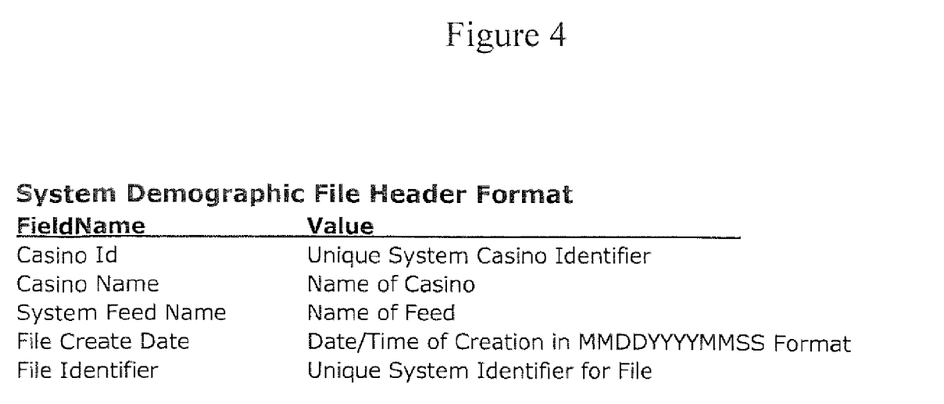
FIG. 4 is an exemplary demographic file header generated by the system organization server depicted in FIG. 1 showing demographics data according to one or more aspects of the present invention.
Figure 5:
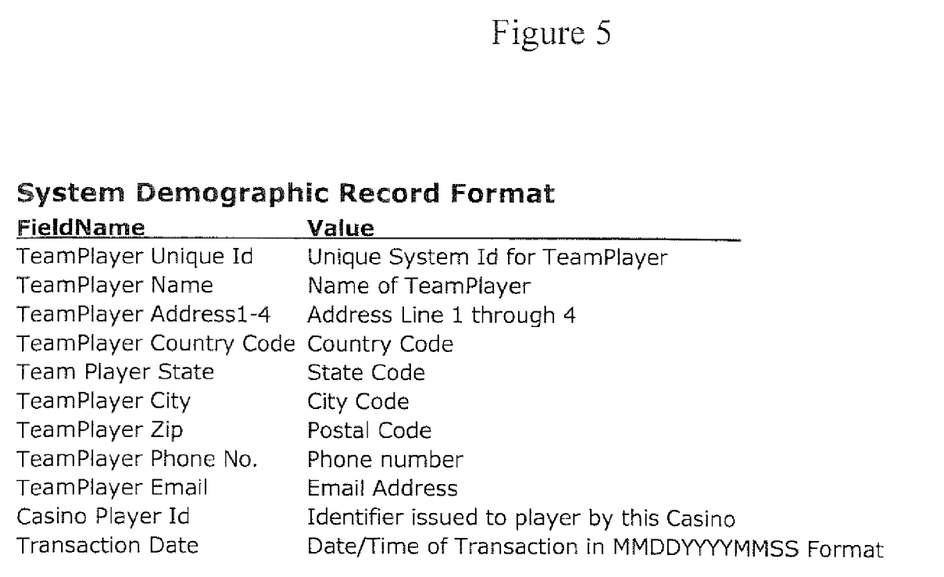
FIG. 5 is an exemplary demographic record generated by the system organization server depicted in FIG. 1 showing demographics data according to one or more aspects of the present invention.

Referring to FIGS. 4-5, the system organization 20 via its server 24 may also transmit demographics information to the server 36 of the system operator 18. For example the demographics information may contain data such as the identification number and/or name of the player 12, the player's 12 contact information (e.g. address, phone number, e-mail), the identification number and/or name of the system operator 18 (e.g. the name of the casino) where the gaming machine 16 is located, location of the gaming event, the date of the transaction, the type of transaction (e.g. the amount of the win or loss). The demographics information may be generated by the system organization 20 and sent to the system operator 18 so that the system operator 18 may provide the player 12 with rewards or "comps" in return for the player's 12 loyalty in playing at the specific system operator's 18 location (e.g. a casino may award the player 12 with a free meal or overnight lodging). The demographics information feed may be transmitted on a periodic basis or at one time at the end of the day.

Figure 6:
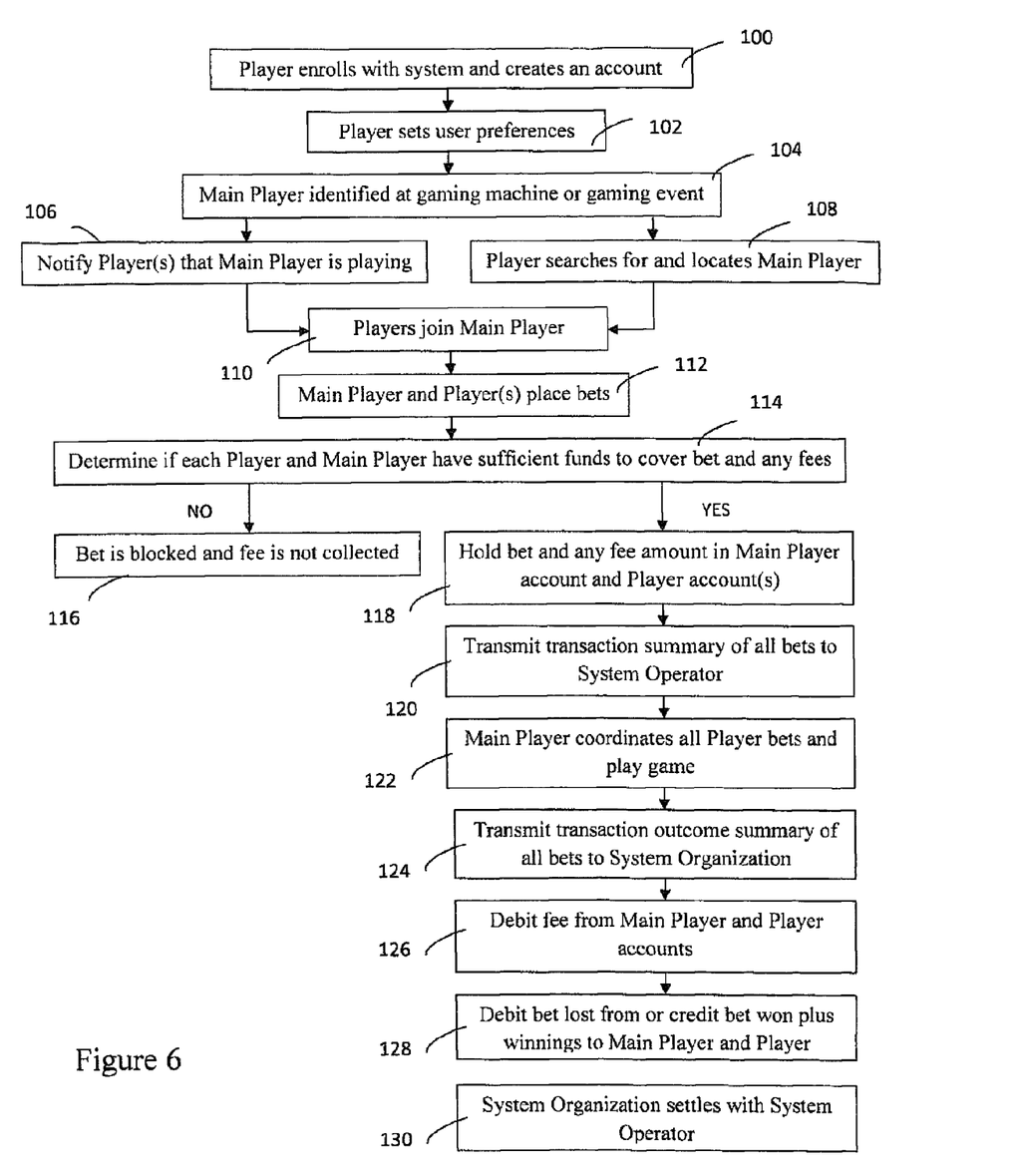
FIG. 6 is an exemplary flowchart depicting a method for allowing other remotely located players to place bets along with a main player located at a gaming machine or a gaming event depicted in FIG. 1 according to one or more aspects of the present application.

Referring to FIG. 6, a flow diagram is shown. At step 100, a player 12 may enroll with the system organization 20 and may be assigned a unique identification name and/or number so that the player 12 may be easily identified within the system. To enroll, the player 12 may provide the system organization 20 with personal information such as, but not limited to, his name, contact information, credit/debit card information, demographics information, and tax information.

When the player 12 enrolls with the system organization 20, an account is set up for the player 12, which may be used to store deposits on behalf of a player 12. The account may be denominated in different currencies or other fungible assets such as, but not limited to, BitCoin digital currency. The account may be a collection of one or more balances on deposit used by the player 12 to place bets in the system 10. A player 12 may increase the balance(s) stored in the account by adding money denominated in various acceptable currencies or a credit or debit card or other mechanism where the system organization 20 receives irrevocable custody and title to a currency or fungible asset. A player 12 may credit their account by using a credit card or debit card, by an Automated Clearing House (ACH) transfer from his commercial bank 34 account (e.g. Bank of America, Chase, etc.) or other type of financial institution, or other types of electronic funds like BitCoin. In one embodiment, the system organization 20 may allow the player 12 to establish a line of credit and the system organization 20 may deposit funds as a loan into the account on behalf of the player 12. This is known in the industry as a "Marker" or "IOU." When a player 12 is making bets, the balance of the account may be credited with amounts from winning a bet and debited when losing a bet.

When a player 12 deposits funds into his system bank account, the money may be credited to the organization's 20 bank account that is maintained at the system organization bank 32 (see FIG. 1). The system organization bank 32 may receive funds on behalf of the players 12 from other commercial banks 34 (see FIG. 1) or other suitable financial institutions. The commercial bank 34 may communicate via its server 38 with the server 24 of the system organization 20 electronically through the network 30 to transfer funds. The system organization 20 may receive a Bank Administration Institute (BAI) file or other type of bank data feed on at least a daily basis to identify when funds are cleared and available to the player 12 for betting. Each player's 12 bank account may be updated using the information contained in the BAI data feed on a predetermined basis (e.g. not exceed one business day). The player's 12 system bank account may be updated to reflect the availability of the funds. Once the funds are available, the player 12 may use the funds to engage in gaming activities at system operators 18 (e.g. casinos, racetracks, or gaming events). For example, if a player 12 loses a wager at a system operator 18 (e.g. casino), the system organization's 20 server 24 may communicate with the system operator's 18 server 36 to initiate a money transfer from the player's 12 account to the system operator's 18 (e.g. casino's) operating account via ACH funds transfer. As a further example, if a player 12 wins a wager at a system operator 18 (e.g. casino), the system operator's 18 server 36 may communicate with the system organization's 20 server 24 to initiate a money transfer from the system operator's 18 (e.g. casino's) operating account to the player's 12 account via ACH funds transfer.

At step 102, after setting up an account with the system organization 20, the player 12 may set his user preferences. When setting up his user preferences, the player 12 may set up a Player Identification Number (PIN) and authentication credentials (e.g. login and password) to access the system 10 as well as his account. This step may also include creating a list of other specific players 12 that he wishes to play with when those others players 12 become main players 14. This list may be modified or deleted. These named lists may include a default group that allows the addition of other players 12. The player 12 may also create additional groups of other players 12 he may choose to notify when he himself is the main player 14 and is placing bets at a gaming machine 16 or at a gaming event. In another embodiment, the player 12 may choose not to set up a list of other specific players 12. Rather, the player 12 may simply search for other main players 14 that have checked in at a gaming machine 16 or at a gaming event via his smartdevice 22 (see step 108 below).

At step 104, the main player 14 may be identified at a gaming machine 16 or at a gaming event. Once the player 12 is enrolled and has created an account, the system organization 20 will issue a unique identification name and/or number and may also issue an identification card to the player 12. The identification card may be made of plastic or other material and have a magnetic strip, an electronic chip, or other suitable means for storing information about the player 12. When the player 12 enters his unique identification name and/or number or inserts his identification card at a gaming machine 16, the player 12 becomes a main player 14. The gaming machine 16 via the system operator's 18 server 36 transmits data to the server 24 of the system organization 20 that the main player 14 has checked in and has been identified at a specific gaming machine 16 located in a specific system operator 18 (e.g. casino). The main player 14 may also use his smartdevice 22 to transmit data via his cellular phone carrier 40 or internet services provider to the server 24 of the system organization 20 that the main player 14 has checked in and has been identified at a specific gaming machine 16 located in a specific system operator 18 (e.g. casino). Alternatively, when a player 12 arrives at a gaming event, the main player 14 may use his smartdevice 22 to scan and read a unique barcode displayed on the gaining device 16 or he may enter in a serial number displayed on the gaming device 16 onto his smartdevice 22 in order to check in and be identified by the system organization 20 as being present at the gaming machine 16.

In another embodiment, instead of inserting a system 10 identification card into the gaining machine 16, the player 12 may insert a system operator 18 identification card (e.g. a casino player's card) into the gaming machine's 16 card reader. The system operator 18 via its server 36 may send data to the server 24 of the system organization 20 notifying the system organization 20 that the player 12 is now a main player 16 at the gaining machine 16. The system organization 20 via its server 24 may then send a communication to the main player's 14 smartdevice 22 requiring the main player 14 to provide an identifying piece of information such as his system password, a secret pass phrase or other information that is generally a secret and known only to the main player 14. This information 14 may have been previously set up as one of the main player's 14 user preferences.

At step 106, players 12 may be notified that the main player 14 has checked in and is playing at a gaming machine 16 or at a gaining event. In one embodiment, the system organization 20 may determine whether the main player 14 had been placed on a list of specific players 12 by any other player(s) 12 that wanted to be notified when the main player 14 had checked in at a gaming machine 16 or gaming event (see step 102). If the main player 12 appears on a player's 12 list of specific players 12, then the system organization 20 via its server 24 may send an automatic notification to the smartdevice 22 of that player 12 which informs the player 12 that the main player 14 has checked in at a gaming machine 16 or at a gaming event. The notification may be automatically generated and sent by the system organization 20 as soon as the main player 14 has inserted his identification card into the gaming machine 14 or notified the system organization 20 through his smartdevice 22 that he is at a gaining event. The notification may be sent via e-mail, a text message, or online chat, voicemail or any other type of suitable communications means. The notification may include information regarding the identification of the main player 12, the gaming machine 16 that the main player 14 is playing, the location of the gaming machine 16, the gaming event that the main player 14 is attending, and/or the location of the gaining event. Upon receiving the notification, the player 12 may elect whether or not to join the main player 14 in placing bets at the gaming machine 16 or the gaming event and may use his smartdevice 22 to transmit his decision via his cellular phone carrier 40 or internet services provider (to play with or not to play with the main player 14) to the system organization 20.

In another embodiment, the system organization 20 may determine whether the main player 14 has created one or more of his own lists of specific players 12 that he may wish to notify whenever he is a main player 14 (see step 102 above). If a player 12 is on the main player's 14 list of specific players 12, then the system organization 20 via its server 24 may send an automatic notification to the smart device 22 of that player 12. Alternatively, the main player 14 may view the specific players 12 that he listed as the ones he may wish to notify when he himself is the main player 14 (see step 102 above). The main player 14 may view these players 12 on the display of the gaming machine 16 or on the main player's smartdevice 22 (when either at the gaming machine 16 or at a gaining event). The players 12 may be identified on the display of the gaming machine 16 or on the smartdevice 22 of the main player 14 by their name, identification number, or some other form of unique identifier. The main player 14 may determine whether or not to send a notification to the specific player(s) 12 and may initiate a message through the gaming machine 14 or through his smartdevice 22 to transmit his decision (to notify or not to notify the player(s) 12 to the system organization 20. The system organization 20 may then send a notification to the smartdevice 22 of the selected player(s) 12 informing the player(s) 12 that the main player 14 has checked in at a gaming machine 16 or at a gaming event. Upon receiving the notification, the player 12 may elect whether or not to join the main player 14 in placing bets at the gaming machine 16 or the gaming event and may use his smartdevice 22 to transmit his decision (to play with or not to play with the main player 14) to the system organization 20.

Any main player 14 may be searched for by any player 12 that may wish to play with him. At step 108, a player 12 may connect to the server 24 of the system organization 20 through a smartdevice 22 (e.g. smartphone, tablet, computer, etc.) to view and search for main players 14. The player 12 may conduct the search for main players 14 that are currently playing on a gaming machine 16 or that are currently making bets at a gaming event by the main player's 14 name and/or identification number. The player 12 may also search for specific gaming machines 16 by the gaming machine's 16 name and/or identification code. The player 12 may also search for a specific gaming event by the gaming event's name, date, and/or identification code. When the player 12 has located a main player 14 that he wishes to play with, the player 12 may send a request to the system organization 20 to play with that main player 14.

The system organization 20 may then transmit data to the gaming machine 16 or to the main player's 14 smartdevice 22, which indicates that one or more players 12 have requested to play with him. The main player 14 may view the players 12 that have searched for and requested to play with the main player 14. The main player 14 may determine whether or not to accept and allow the player 12 to join him in placing bets at the gaming machine 16 or the gaming event and may use his smartdevice 22 or the gaming machine 16 to transmit his decision (to allow [accept] or not to allow the player 12 to join him [reject]) to the system organization 20.

At step 110, the system organization 20 determines which players 12 have decided to play with the main player 14 as well as which players 12 the main player 14 has selected to play with him. All of the players 12 then join the main player 14 to play at the gaming machine 16 or at the gaming event.

At step 112, the main player 14 and the players 12 may place their bets. At this time, an initial transaction summary may be created. The transaction summary may include information such as identification information of the main player 14, identification information of any additional players 12, identification information for the system operator 18, identification information for the gaming machine 16, identification for the gaming event, amount of the wager placed by the main player 14, amount of any additional wagers placed by any other players 12 that have joined the main player 14, as well as the date and time. A transaction summary may be created for each game played on a gaming machine 16 or at a gaming event. The transaction summary is dynamic as it may be constantly updated according to how many additional players 12 join the main player 14 and according to how many additional wagers are placed by the additional players 12 as well as the amounts of the main player's 14 wager(s) and the other players' 12 additional wagers. While the wagers are being placed, the main player 14 may communicate with other players 12 by sending and receiving text messages or voice messages through the display of the gaining machine 16 or on his smartdevice 22. And the players 12 may communicate with the main player 14 by sending and receiving text messages or voice messages through their smartdevices 22. The communications may be by text, speech, or video. In one embodiment, the system organization 20 or the system operator 18 may limit the amount of time within which the players 12 may place a bet. This time limit may be transmitted from the system organization 20 to the smartdevice 22 of the player 12, and may appear as a time clock or countdown. After expiration of the time limit, no further bets would be allowed.

At step 114, after each bet is placed, the system organization 20 may determine whether sufficient funds are present in each of the players' 12 accounts to cover the bet. The system operator 18 and/or the system organization 20 may also charge a fee for placing a bet. The system organization 20 may also determine whether sufficient funds are present in each of the players' 12 accounts to cover any applicable fees. For a main player 14 physically located at the gaming machine 16 or gaming event, the main player 14 may alternatively pay the system Operator 18 for the wager and any fees directly through the gaming machine 16 through its standard bill acceptor, coin slot, or credit card reader. At step 116, if there are insufficient funds in a player's 12 account, then for that player 12, the fee will not be debited and the bet will be blocked and will not take place. At step 118, if there are sufficient funds in a player's 12 account to cover the amount of the bet (as well as any applicable fee), then a hold may be placed on the player's 12 account in the total amount of the bet and the fee.

Figure 7:
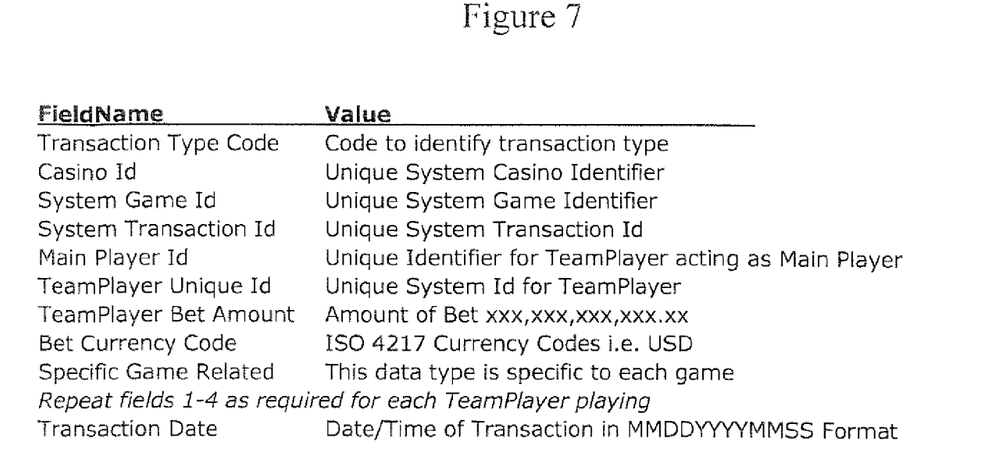
FIG. 7 is an exemplary start of game transaction record generated by the system organization server depicted in FIG. 1 showing transaction data for a game prior to start according to one or more aspects of the present invention.

At step 120, a Start of Game transaction data feed which may contain the updated dynamic transaction summary of all bets created by the system organization 20 may be transmitted via its server 24 to the server 36 of the system operator 18 (see FIG. 7). The transaction summary may contain updated details of the amount of the wager placed by the main player 14 and the amount of any additional wagers placed by any other players 12 that have joined the main player 14, as well as other information. For example, the transaction summary may contain updated identification names/numbers of each player 12 that have joined the main player 14, the gaming machine 16 that is being played and the identification of the casino that the gaming machine 16 is located in (or the gaming event and the location of the gaining event), the amounts wagered by the main player 14 and additional players 12, the date/time, etc. A unique identification name and/or number may be required for each player so that a system operator 18 may keep track of all of the bets being placed by a player 12. The system operator 18 may also choose to receive the demographic data feed. This data feed will allow them to associate the player 12 with the name and address and other information contained in the data feed. Using and tracking bets by the player's unique identification name and/or number will allow the system operator 18 to track and perform their own audits and reconciliation of the settlement activities between the system organization 20 and the system operator 18.

As mentioned above, the transaction summary of each game of a gaming machine 16 or gaming event is dynamic as it is constantly changing and being updated according to the players 12 that join the main player 14, the number of players 12 placing wagers as well as the amounts of each wager being placed by the participating players 12. For example, prior to the pull of the lever (push of a button or other user input required to initiate a game) on a slot machine, a main player 14 may bet $10; therefore, the initial transaction summary for that game would only contain information regarding the main player's 14 wager of $10. If two other players 12 join the main player 14 on the game and each of the other players 12 bet $5, then the transaction summary would he updated to include the identification information of the other two players 12 and the amounts of their wagers; i.e. $5 each. The updated transaction summary would be sent to the system operator 18. The transaction summary may also be affected by the determination of whether or not the main player 14 or the other players 12 have enough money in their accounts to cover the wagers that they wish to place and any applicable fees. If any player 12 (even a main player 14) does not have enough money in his system bank account, then his wager is blocked (see step 116 above) and the transaction summary is updated to exclude that players 12 wager.

At step 122, the main player 14 coordinates with all of the other players 12 to make sure that all of their bets are ready before the start of the game or event. The main player 14 may continue to communicate with other players 12 throughout the betting process by sending and receiving text messages or voice messages through the display of the gaming machine 16 or on his smartdevice 22. The main player 14 may also communicate with the other players 12 through video as shown through the display of the gaming machine 16 or on their smartdevices 22. And the players 12 may continue to communicate with the main player 14 throughout the betting process by sending and receiving text messages or voice messages through their smartdevices 22. Once all of the bets are ready, the main player 14 initiates the game. For example, in an embodiment where the gaming machine 16 is a slot machine, the main player 14 may pull the lever.

At step 124, the outcome of the game is displayed on the gaming machine 16 and is also transmitted from the system operator 18 via its server 36 to the server 24 of the system organization 20, which may then be relayed to the smartdevices 22. In the example of a gaming event (e.g. horse race), the event outcome is transmitted from the system operator 18 (e.g. race track) to the system organization 20, which may then be relayed to the smartdevices 22. The system operator 18 also creates and transmits a transaction summary to the system organization 20 (see FIG. 8). The transaction summary may contain the identification name/number of each player 12, the gaming machine 16 that is being played and the identification of the casino that the gaining machine 16 is located in (or the gaining event and the location of the gaming event), the amount wagered, the date/time, as well as the outcome (win/loss/blocked) of the bet for each player 12.

At step 126, if a fee is to be collected, it may debited from the account and credited to the system operator 18 and/or the system organizer 20 regardless of the outcome of the gainer win or lose. The fee amount may be held in one or more accounts that are maintained by the system operator 18 and/or the system organization 20. These accounts may be denominated in different currencies, used to store the value of a fungible asset or other value and used within the system 10 to store fees or to settle bets made by players 12.

At step 128, the bet amount will be debited from the player's 12 account if he has lost; conversely, the bet amount will be credited to the player's 12 account if he was won in addition to any applicable winnings.

At step 130, at the end of the day or on several occasions throughout the day, the system organization 20 (or its bank 32) and the system operator 18 (or its bank) may perform a cash settlement. For example, the system organization 20 may net all of the transaction summaries of a particular system operator 18 to determine a cash balance between the system organization 20 and the system operator 18. The cash settlement may be conducted via Automated Clearing House (ACH) transfer between server 24 of the system organization 20 (or its bank 32 or financial institution) and the server 36 of the system operator 18 (or its bank or financial institution).

Figure 8:
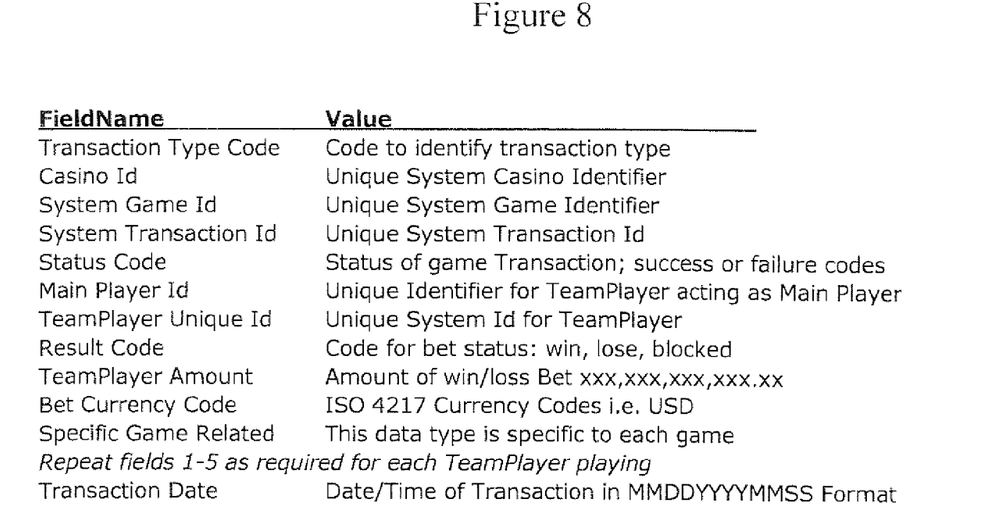
FIG. 8 is an exemplary end of game transaction record generated by the system organization server depicted in FIG. 1 showing transaction data for the game of FIG. 7 after it has finished according to one or more aspects of the present invention.

Referring to FIG. 8, system operator 18 may use their own algorithms for each game to determine the odds and outcomes for each game as it is played. The system operator 18 may determine what the outcome of the play is and use its algorithms to determine if a player 12 has won or lost and if won what the payoff amount is for each bet. An End of Game Transaction data feed or summary, such as the one depicted in this figure may return the results of the play to the system organization 20 so that the system organization 20 knows whether to pay the player 12 by crediting the amount won or debiting the amount lost from the player's 12 system bank account.

From the perspective of the system operator 18 (e.g. casino), a main player 14 that is playing with two other players 12 on the gaming machine 16 would be the same as having three gaming machines 16 located within the casino and having all three players present and playing directly on those gaming machines 16. For example, if the main player 14 was playing on a gaining machine 16 that was a slot machine and placed the maximum allowed bet of $10 on a diagonal line; the second player 12 also placed the maximum bet of $10 on a diagonal line; the third player 12 also placed a maximum bet of $10 but placed it on a vertical line; and the main player's 14 slot machine hits a diagonal line, then both the main player 14 and the player 12 that bet on the diagonal line would win. The casino would calculate the odds and payouts for the team gaming system 10 as if there were three separate slot machines in the casino and as if each of the two winning players 12 had bet the maximum on their respective machines and both won on their respective spin.

Similarly, if a progressive bet was placed by the winning main player 14 and the other winning player 12 and the progressive bet wins, then the casino would calculate the odds and payouts for the progressive in the full amount for each of the winning main player 14 and other winning player 12 as if there were three separate slot machines in the casino and as if each of the two winning players 12 had won a progressive bet on their respective slot machine. Alternatively, the system operator 18 may create a new algorithm for paying out the progressive bets as desired.

The foregoing description is illustrative of particular embodiments of the application, but is not meant to be limitation upon the practice thereof. While embodiments of the disclosure have been described in terms of various specific embodiments, those skilled in the art will recognize that the embodiments of the disclosure may be practiced with modifications within the spirit and scope of the claims.

What is claimed is:

1. A method for allowing multiple players to place independent wagers on a single game comprising the steps of:
identifying a main player that is playing a game at one of a gaming machine and a gaming event located within a system operator, wherein the gaming machine is a slot machine operated by the main player and comprises:
an input mechanism to allow the main player to enter commands into the gaming machine;
a display that shows:
the game that the main player is playing on the gaming machine; and
at least one of a text message, a video message, and a voice message communicated between the main player and at least a second player;
an acceptor for receiving a wager and establishing a credit balance;
joining the second player with the main player, wherein the second player is remotely located from the system operator and uses a smartdevice that is in communication with the system operator to place wagers on the same game played by the main player as if the second player was one of physically located and playing on the same gaming machine that the main player is playing on and physically located at the same gaming event as the main player and placing his own bets;
sending and receiving through the display of the gaming machine while the wagers are being placed the at least one of a text message, a video message, and a voice message communicated between the main player and the second player;
creating a dynamic transaction summary for the game wherein the dynamic transaction summary for the game is comprised of: identification information of the main player, identification information of the second player, identification information of the system operator; identification information for one of the gaming machine and the gaming event; an amount of at least one wager placed by the main player; an amount of at least one additional wager placed by the second player; date; and time;
determining whether the main player is eligible to place the wager on the game, wherein one of a payment made directly through the gaming machine and a system bank account balance of the main player determines the eligibility of the main player;
determining whether the second player is eligible to place the additional wager on the game, wherein only a system bank account balance of the second player determines the eligibility of the second player;
updating the dynamic transaction summary based on the individual eligibility of each of the main player and the second player to place the wager and the additional wager respectively;
transmitting the updated dynamic transaction summary to the system operator;
receiving data from the system operator regarding an outcome of the game; and
updating the system bank account balance of the main player by one of crediting and debiting the amount of the wager placed by the main player and updating the system bank account balance of the second player by one of crediting and debiting the amount of the additional wager placed by the second player depending upon the outcome of the game.

2. The method of claim 1 further comprising notifying the second player that the main player has been identified at the system operator by sending a notification message from a system organization to the second player.

3. The method of claim 1 further comprising the steps of:
assessing a first fee for the main player to place the wager on the game and assessing a second fee for the second player to place the additional wager;
determining whether the main player is eligible to pay the first fee on the wager, wherein one of the payment made directly through the gaming machine and the system bank account balance of the main player determines the eligibility of the main player;
determining whether the second player is eligible to pay the second fee on the additional wager, wherein only the system bank account balance of the second player determines the eligibility of the second player;
updating the dynamic transaction summary based on the eligibility of each of the main player and the second player to pay the first fee and to pay the second fee respectively; and
updating the system bank account balance of the main player when the payment is made through a system bank account by debiting the amount of the first fee and updating the system bank account balance of the second player by debiting the amount of the second fee independent of the outcome of the game.

4. A team gaming system that allows multiple players to place independent wagers on a single game comprising:
a network configured for communication between a system organization, one or more system operators, and a plurality of players registered with the system organization;
at least one system organization server with a database containing information for the plurality of players, wherein the at least one system organization server has a processor configured to access the database and to execute a set of program instructions causing the processor to:
identify a main player that is playing a game at one of a gaming machine and a gaming event located within a system operator, wherein the gaming machine is a slot machine operated by the main player and comprises:
an input mechanism to allow the main player to enter commands into the gaming machine;
a display that shows:
the game that the main player is playing on the gaming machine; and
at least one of a text message, a video message, and a voice message communicated between the main player and at least a second player;
an acceptor for receiving a wager and establishing a credit balance;
join the second player with the main player, wherein the second player is remotely located from the system operator and uses a smartdevice that is in communication with the system operator to place wagers on the same game played by the main player as if the second player was one of physically located and playing on the same gaming machine that the main player is playing on and physically located at the same gaming event as the main player and placing his own bets;

sending and receiving through the display of the gaming machine while the wagers are being placed the at least one of a text message, a video message, and a voice message communicated between the main player and the second player;

create a dynamic transaction summary for the game wherein the dynamic transaction summary for the game is comprised of: identification information of the main player, identification information of the second player, identification information of the system operator;

identification information for one of the gaming machine and the gaming event; an amount of at least one wager placed by the main player; an amount of at least one additional wager placed by the second player; date; and time;

determine whether the main player is eligible to place the wager on the game, wherein one of a payment made directly through the gaming machine and a system bank account balance of the main player determines the eligibility of the main player;

determine whether the second player is eligible to place the additional wager on the game, wherein only a system bank account balance of the second player determines the eligibility of the second player;

update the dynamic transaction summary based on the individual eligibility of each of the main player and the second player to place the wager and the additional wager respectively;

transmit the updated dynamic transaction summary to the system operator;

receive data from the system operator regarding an outcome of the game; and update the system bank account balance of the main player by one of crediting and debiting the amount of the wager placed by the main player and update the system bank account balance of the second player by one of crediting and debiting the amount of the additional wager placed by the second player depending upon the outcome of the game.

5. The system of claim 4 wherein the network is further configured for communication between the system organization and a plurality of smartdevices operated by the plurality of players, wherein data transmitted between the processor of the system organization and the plurality of smartdevices is transmitted via at least one of a plurality of cellular phone carriers and a plurality of internet service providers.

6. The system of claim 5 wherein each smartdevice may be one of a smartphone, a computing tablet, and a personal computer.

7. The system of claim 6 wherein the set of program instructions executed by the processor further causes the processor to relay messages among the plurality of players, wherein the messages are sent via the smartdevices and the gaming machine.

8. The system of claim 4 wherein the set of program instructions executed by the processor further causes the processor to:

store in the database at least one list created by the main player, wherein the list created by the main player contains identification information of at least one specific player that should receive a notification message from the system organization when the main player is identified at the system operator and playing the game; and transmit the notification message to any specific player contained on the list created by the main player.

9. The system of claim 4 wherein the set of program instructions executed by the processor further causes the processor to:

assess a first fee for the main player to place the wager on the game and assessing a second fee for the second player to place the additional wager on the game;

determine whether the main player is eligible to pay the first fee on the wager, wherein one of the payment made directly through the gaming machine and the system bank account balance of the main player determines the eligibility of the main player;

determine whether the second player is eligible to pay the second fee on the additional wager, wherein only the system bank account balance of the second player determines the eligibility of the second player;

update the dynamic transaction summary based on the eligibility of each of the main player and the second player to pay the first fee and pay the second fee respectively; and updating the system bank account balance of the main player when the payment is made through a system bank account by debiting the amount of the first fee and updating the system bank account balance of the second player by debiting the amount of the second fee independent of the outcome of the game.

10. A method for allowing multiple players to place independent wagers on a single game comprising the steps of:

identifying a main player that is playing a game at one of a gaming machine and a gaming event located within a system operator, wherein the gaming machine is a slot machine operated by the main player and comprises:

an input mechanism to allow the main player to enter commands into the gaming machine;

a display that shows:

the game that the main player is playing on the gaming machine; and at least one of a text message, a video message, and a voice message communicated between the main player and at least a second player;

an acceptor for receiving a wager and establishing a credit balance;

transmitting data to the second player regarding of the main player that has been identified at the system operator, wherein the at least second player is remotely located from the system operator and uses a smartdevice that is in communication with the system operator to place wagers on the same game played by the main player as if the second player was one of physically located and playing on the same gaming machine that the main player is playing on and physically located at the same gaming event as the main player and placing his own bets;

receiving data from the main player regarding at least one wager that the main player is placing on the game;

receiving data from the at least second player regarding at least one additional wager that the at least second player is placing on the same game;

sending and receiving through the display of the gaming machine while the wagers are being placed the at least one of a text message, a video message, and a voice message communicated between the main player and the second player;

creating a dynamic transaction summary for the game wherein the dynamic transaction summary for the game is comprised of: identification information of the main player, identification information of the at least second player, identification information of the system operator; identification information for one of the gaming machine and the gaming event; an amount of the at least one wager placed by the main player; an amount of the at least one additional wager placed by the at least second player; date; and time;

determining whether the main player is eligible to place the wager on the game, wherein one of a payment made directly through the gaming machine and a system bank account balance of the main player determines the eligibility of the main player;

determining whether the second player is eligible to place the additional wager on the game, wherein only a system bank account balance of the second player determines the eligibility of the second player;

updating the dynamic transaction summary based on the individual eligibility of each of the main player and the at least second player to place the at least one wager and the at least one additional wager respectively;

transmitting the updated dynamic transaction summary to the system operator;

receiving data from the system operator regarding an outcome of the game;

transmitting the data received from the system operator regarding the outcome of the game to the at least second player;

updating the system bank account balance of the main player by one of crediting and debiting the amount of the at least one wager placed by the main player and updating the system bank account balance of the at least second player by one of crediting and debiting the amount of the at least one additional wager placed by the at least second player depending upon the outcome of the game; and settling the at least one wager made by the main player and settling the at least one additional wager made by the at least second player with the system operator.

11. The method of claim 10 further comprising the step of relaying messages between the main player and the at least second player, wherein the messages are relayed through the system organization.

12. The method of claim 10 further comprising the steps of:

assessing at least a first fee for the main player to place the at least one wager on the game and assessing at least a second fee for the at least second player to place the at least one additional wager;

determining whether the main player is eligible to pay the at least first fee on the at least one wager, wherein one of the payment made directly through the gaming machine and the system bank account balance of the main player determines the eligibility of the main player;

determining whether the second player is eligible to pay the at least second fee on the at least one additional wager, wherein only the system bank account balance of the second player determines the eligibility of the second player;

updating the dynamic transaction summary based on the eligibility of each of the main player and the at least second player to pay the at least first fee and pay the at least second fee respectively; and updating the system bank account balance of the main player by subtracting the amount of the at least first fee and updating the system bank account balance of the at least second player by subtracting the amount of the at least second fee independent of the outcome of the game.

* * * * *